United States Patent
Yang

(10) Patent No.: US 10,598,497 B2
(45) Date of Patent: Mar. 24, 2020

(54) METHOD AND DEVICE FOR GENERATING GEOGRAPHIC COORDINATES

(71) Applicant: X-CONTROL SYSTEM CO., LTD., Beijing (CN)

(72) Inventor: Fan Yang, Beijing (CN)

(73) Assignee: X-CONTROL SYSTEM CO., LTD., Beijing (CN)

( * ) Notice: Subject to any disclaimer, the term of this patent is extended or adjusted under 35 U.S.C. 154(b) by 114 days.

(21) Appl. No.: 15/753,164

(22) PCT Filed: Aug. 18, 2015

(86) PCT No.: PCT/CN2015/087398
§ 371 (c)(1),
(2) Date: Feb. 15, 2018

(87) PCT Pub. No.: WO2017/028203
PCT Pub. Date: Feb. 23, 2017

(65) Prior Publication Data
US 2018/0252529 A1   Sep. 6, 2018

(51) Int. Cl.
*G01C 21/20* (2006.01)
*G01C 15/00* (2006.01)
*G01C 21/00* (2006.01)
*G01C 21/10* (2006.01)

(52) U.S. Cl.
CPC .......... *G01C 21/20* (2013.01); *G01C 15/002* (2013.01); *G01C 21/005* (2013.01); *G01C 21/10* (2013.01)

(58) Field of Classification Search
CPC .......... G01C 21/20; G01C 3/08; G01C 15/00

USPC ........................................................ 701/408
See application file for complete search history.

(56) References Cited

U.S. PATENT DOCUMENTS

| 4,899,161 A | 2/1990 | Morin, Jr. et al. |
| 5,672,820 A * | 9/1997 | Rossi ............... G01C 21/20 |
| | | 348/116 |
| 6,480,148 B1 * | 11/2002 | Wilson ............. G01C 15/00 |
| | | 342/357.32 |

(Continued)

FOREIGN PATENT DOCUMENTS

| CN | 102214000 A | 10/2011 |
| CN | 102564417 A | 7/2012 |
| CN | 103438887 A | 12/2013 |

OTHER PUBLICATIONS

PCT International Search Report, PCT/CN2015/087398, dated Apr. 29, 2016, 5 Pages.

*Primary Examiner* — Tan Q Nguyen
(74) *Attorney, Agent, or Firm* — Fenwick & West LLP

(57) ABSTRACT

A method (100) for generating a geographic coordinate and a device (500) for generating a geographic coordinate. The method (100) comprises: enabling a device to point to a position point (102); obtaining data including a geographic coordinate of the device, a relative height between the device and the position point and pointing information of the device (104); and generating a geographic coordinate of the position point based on the data (106). The device (500) for generating a geographic coordinate comprises a pointing module (502), a data obtaining module (504) and a generating module (506). By enabling the device to point to a desired position point, a geographic coordinate of the desired position point can be obtained rapidly.

17 Claims, 4 Drawing Sheets

(56) References Cited

U.S. PATENT DOCUMENTS

| | | |
|---|---|---|
| 7,595,724 B2 | 9/2009 | Li et al. |
| 8,058,989 B2 | 11/2011 | Li et al. |
| 9,091,540 B2 * | 7/2015 | Laabs .................... G01C 15/00 |
| 2005/0057745 A1 * | 3/2005 | Bontje ................. G01C 15/002 |
| | | 356/139.03 |

* cited by examiner

US 10,598,497 B2

METHOD AND DEVICE FOR GENERATING GEOGRAPHIC COORDINATES

FIELD

Embodiments of the present disclosure generally relate to geographic information technology, and more specifically, to method and device for generating a geographic coordinate.

BACKGROUND

Generally, control operations of the intelligent mobile device (e.g., drones, robots etc.) are performed by a wireless remote control. For example, the operating staff transmits control commands to the intelligent mobile device via a controller (such as a remote control, a handheld control terminal, or a ground control console). The traditional control methods include the following two types. One method is dynamic controlling, the controller transmits dynamic control commands to the intelligent mobile device, for example the controller dynamically controlling movement direction, movement speed or flying height of the intelligent mobile device. Another method is parameter control, the controller transmits expected target position to the intelligent mobile device, for example, the controller transmits expected coordinate of latitude and longitude and height coordinate and the like, such that the intelligent mobile device moves according to the received coordinate information.

However, the dynamic controlling method requires continuous corrections from the operating staff. Besides, when orientation of the operating staff differs from the pointing of the mobile device, operations of the dynamic control is especially difficult. Therefore, it calls for long-term training of the operating staff to accurately control the movement direction. Although the parameter control method does not need dynamic corrections from the operating staff, it requires the operating staff to have a strong understanding of position and direction of the intelligent mobile device. For example, if it is required to control the intelligent mobile device to move 10 m forward, the operating staff needs to obtain the movement direction and distance according to the orientation of the intelligent mobile device and using complex trigonometric function, and then acquires the coordinate of the expected position point based on the current position coordinate of the intelligent mobile device. Therefore, the parameter control method needs complex calculation from the operating staff while the control operation is not simple and visual enough.

Hence, in the case that long-term training and complex calculation of the operating staff are not needed, how to rapidly obtain a geographic coordinate of the expected position point becomes a problem that demands to be solved.

SUMMARY

In light of this, embodiments of the present disclosure provide a method and device for generating a geographic coordinate, which can simply and rapidly obtain a geographic coordinate of the expected position point.

According to a first aspect of the present disclosure, there is disclosed a method for generating a geographic coordinate. The method comprises: enabling a device to point to a position point; obtaining data including a geographic coordinate of the device, a relative height between the device and the position point, and pointing information of the device; and generating a geographic coordinate of the position point based on the data.

According to one embodiment of the present disclosure, wherein the pointing information of the device comprises: an angle between the pointing direction of the device and a horizontal plane, and a horizontal angle between the pointing direction of the device and geographic north.

According to another embodiment of the present disclosure, wherein the enabling a device to point to a position point comprises: enabling the device to point to the position point using an optical aiming device or a mechanical aiming device.

According to another embodiment of the present disclosure, wherein enabling a device to point to a position point comprises: enabling the device to point to the position point using a camera, wherein the camera is located inside or outside the device.

According to one embodiment of the present disclosure, wherein the enabling a device to point to a position point comprises: displaying, on a display apparatus of the device, an icon of a central point of the camera; and adjusting the device such that the icon of the central point of the camera overlaps with the position point.

According to another embodiment of the present disclosure, wherein the icon of the central point comprises any of the following: an intersection point of dotted lines, an arrow, a ray and a single point.

According to another embodiment of the present disclosure, wherein obtaining data including a geographic coordinate of the device, a relative height between the device and the position point and pointing information of the device comprises: obtaining the angle between the pointing direction of the device and the horizontal plane using an acceleration sensor.

According to one embodiment of the present disclosure, wherein the obtaining the angle between the pointing direction of the device and the horizontal plane using an acceleration sensor comprises: obtaining the angle between the pointing direction of the device and the horizontal plane by calculating a ratio between an acceleration value in the pointing direction of the device and a value of acceleration of gravity.

According to another embodiment of the present disclosure, wherein the obtaining data including a geographic coordinate of the device, a relative height between the device and the position point and pointing information of the device comprises: obtaining the relative height between the device and the position point by receiving a user input or using a rangefinder.

According to another embodiment of the present disclosure, wherein the obtaining data including a geographic coordinate of the device, a relative height between the device and the position point and pointing information of the device comprises: obtaining the horizontal angle between the pointing direction of the device and geographic north using an electronic compass.

According to one embodiment of the present disclosure, wherein the obtaining data including a geographic coordinate of the device, a relative height between the device and the position point and pointing information of the device comprises: obtaining the geographic coordinate of the device using a satellite positioning sensor or a geographic information system.

According to another embodiment of the present disclosure, wherein the generating the geographic coordinate of the position point based on the data comprises: calculating a horizontal distance between the device and the position point based on the angle between the pointing direction of the device and the horizontal plane and the relative height between the device and the position point; and calculating the geographic coordinate of the position point based on the horizontal distance between the device and the position point, the horizontal angle between the pointing direction of the device and geographic north and the geographic coordinate of the device.

According to another embodiment of the present disclosure, the method further comprises: after generating the geographic coordinate of the position point, enabling an external device controlled by the device to move to the position point.

According to another aspect of the present disclosure, there is disclosed a device for generating a geographic coordinate, comprising: a pointing module configured to enable a device to point to a position point; a data obtaining module configured to obtain data including a geographic coordinate of the device, a relative height between the device and the position point and pointing information of the device; and a generating module configured to generate a geographic coordinate of the position point based on the data.

Example embodiments of the present disclosure can bring at least one of the following technical effects: by enabling the device to point to the position point and acquiring sensor data of the device, rapidly obtaining a geographic coordinate of the expected position point; moreover, simplifying control operations of the intelligent mobile device and achieving "what you see is what you get" effect in terms of position coordinates generation.

BRIEF DESCRIPTION OF DRAWINGS

Through the following detailed description with reference to the accompanying drawings, features, advantages and other aspects of various embodiments of the present disclosure will become more apparent. Several embodiments of the present disclosure will be illustrated by way of example but not limitation in the drawings in which.

DETAILED DESCRIPTION OF EMBODIMENTS

Figure 1:
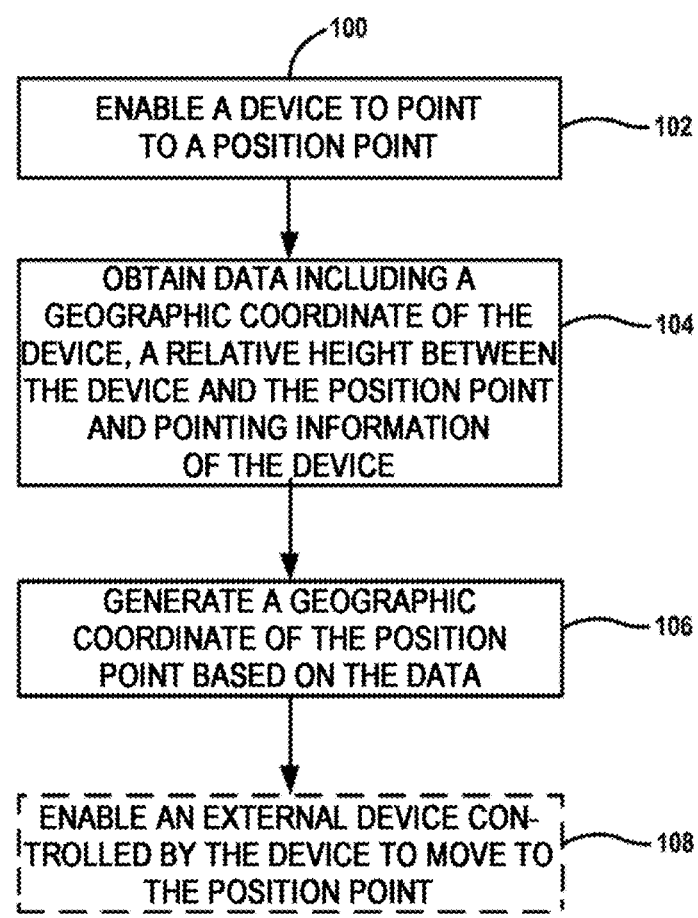
FIG. 1 illustrates a flowchart of a method 100 for generating a geographic coordinate according to embodiments of the present disclosure.

Various example embodiments of the present disclosure will be described in details below with reference to the drawings. Flowchart and block diagram in the drawings illustrate system architecture, functions and operations that may possibly be implemented by the method and the system according to various embodiments of the present disclosure. It should be noted that each block in the flowchart or the block diagram can represent a module, a program segment, or a part of the code, wherein the module, the program segment and the part of the code can include one or more executable instructions for implementing logic functions stipulated in various embodiments. It should also be noted that the functions indicated in the block can also occur in a sequence different from the one denoted in the drawing in some alternative implementations. For example, the two subsequently connected blocks in fact can be basically executed in parallel, or they can be executed in a reverse sequence depending on the involved functions. It should also be noted that each block in the flowchart and/or block diagram, and combinations of blocks in the flowchart and/or block diagram, can be implemented using a hardware-based system dedicated for executing specified functions or operations, or using a combination of dedicated hardware and computer instructions.

As used herein, the terms "comprises," "includes" and their variants are to be read as open-ended terms that mean "comprises/includes, but not limited to." The term "based on" is to be read as "based at least in part on." The term "one example embodiment" is to be read as "at least one embodiment." The terms "another embodiment" and "another embodiment" are to be read as "at least another embodiment." Related definitions of other terms will be presented in the following description.

It should be understood that the example embodiments are provided to enable those skilled in the art to better understand and further implement embodiments of the present disclosure rather than limiting the scope of the present invention in any manners.

FIG. 1 illustrates a flowchart of a method 100 for generating a geographic coordinate according to embodiments of the present disclosure. With reference to FIG. 1, at step 102, the device is enabled to point to a position point. The device refers to a control device capable of controlling movement of an external intelligent device, and the device may be any intelligent device having a sensor (such as acceleration sensor, electronic compass, satellite positioning sensor etc.), including but not limited to smart phone, tablet computer, laptop computer, intelligent controller and wearable device etc. The device provides a sensor data interface that can output corresponding sensor data, such as pointing of the device (e.g., orientation and direction), an angle of the device relative to the horizontal plane, a geographic coordinate of the device (such as, the coordinate of latitude and longitude), and the like.

According to embodiments of the present disclosure, wherein the enabling the device to point to the position point comprises: enabling the device to point to the position point using an optical aiming device or a mechanical aiming device, wherein the optical aiming device is a component that aims through an optical viewfinder (such as lens), and the mechanical aiming device is a components that aims through a metal sight. The operating staff may aim the device at an expected position point through the optical aiming device or the mechanical aiming device, and aiming can be performed by means of a display apparatus of the device, or the mechanical aiming can also be conducted by the operating staff.

According to embodiments of the present disclosure, wherein the enabling the device to point to the position point comprises: enabling the device to point to the position point using a camera, wherein the camera is located inside or outside the device. Camera is one of the most common components in the intelligent device and the view is found through the camera. The operating staff can aim the camera of the device at the expected position point. According to another embodiment of the present disclosure, in order to aim more accurately, the device can be externally connected to a dedicated camera (for example, the device is connected to an independent camera positioned on a pan-tilt), to enhance accuracy of position pointing.

Figure 2:
FIG. 2 illustrates an interaction interface of enabling the device to point to the position point according to one embodiment of the present disclosure.

According to embodiments of the present disclosure, wherein the enabling the device to point to the position point comprises: displaying an icon of a central point of the camera on the display apparatus of the device; and adjusting the device such that the icon of the central point of the camera and the position point coincide with each other. For example, in the example shown by FIG. 2, the scene captured by the camera is displayed in real time on the display apparatus of the device and the operating staff continuously adjusts direction of the device according to the expected position point, such that the device points to the expected position point. The adjusting direction can be adjusting upward and downward directions, or left and right directions etc. According to one embodiment of the present disclosure, when the central point icon of the camera (for example an intersection point of dotted lines in FIG. 2) coincides with the expected position point, it means that the device is pointing to the expected point.

According to embodiments of the present disclosure, wherein the icon of the central point of the camera includes any of the following: an intersection point of dotted lines, an arrow, a ray and a single point. For example, various striking icons may be provided on the display apparatus of the device, to remind users that the icon is the position to which the device is currently pointing. According to another embodiment of the present disclosure, the central point icon of the camera can be displayed at the center position of the display apparatus.

Continue to proceed with step 104 to obtain data including a geographic coordinate of the device, a relative height between the device and the position point and pointing information of the device. For example, the geographic coordinate of the device may represent the current latitude and longitude coordinates of the device (such as, 39.9694721070, 116.3548332380), the relative height between the device and the position point may represent the distance between the device and the position point in the vertical direction, and the pointing information of the device indicates three-dimensional orientation information of the device, such as angle information between the device and each direction of the three-dimensional geographic coordinate. According to FIG. 2, when the device is pointing to the expected position point, the operating staff triggers "MOVE" button on the screen, and then the device starts obtaining data required for calculating a geographic coordinate of the position point. According to another embodiment of the present disclosure, after the device points to the position point, the device can automatically obtain the required data without any operation from the operating staff.

According to one embodiment of the present disclosure, wherein the pointing information of the device comprises an angle between the pointing direction of the device and the horizontal plane, and a horizontal angle between the pointing direction of the device and the geographic north. For example, the pointing direction of the device may refer to a direction of a connecting line between the current position point of the device and the pointed position point. The horizontal angle may represent an angle between projections of two directions on the horizontal plane, and the horizontal angle between the pointing direction of the device and the geographic north indicates an angle between a projection of the pointing direction of the device on the horizontal plane and the geographic north direction. For example, the size of the angle can be defined according to a commonly used method in the art, for example, the angle is dimensioned between −180° to +180°, and the angle in the clockwise direction is defined as positive. That is, when the projection direction of the pointing direction of the device on the horizontal plane is in the clockwise direction of the geographic north direction, the angle is positive; when the projection direction of the pointing direction of the device on the horizontal plane is in the counter-clockwise direction of the geographic north direction, the angle is negative.

According to another embodiment of the present disclosure, it can directly obtain the pointing direction of the device based on the sensor data of the device. For example, the pointing direction of the device is constructed as vector $\vec{P}$, and when the pointed position point is on the ground, the pointed position point is an intersection point of the vector $\vec{P}$ and the ground.

According to embodiments of the present disclosure, wherein the obtaining data including a geographic coordinate of the device, a relative height between the device and the position point and pointing information of the device comprises: obtaining an angle between the pointing direction of the device and the horizontal plane through an acceleration sensor. According to another embodiment of the present disclosure, wherein the obtaining an angle between the pointing direction of the device and the horizontal plane through an acceleration sensor includes: obtaining the angle between the pointing direction of the device and the horizontal plane by calculating a ratio between an acceleration value in the pointing direction of the device and a value of acceleration of gravity. According to another embodiment of the present disclosure, when the device is located on the pan-tilt, the angle between the pointing direction of the device and the horizontal plane can be provided by the frame angle of the pan-tilt, whereas the frame angle can be measured by a potentiometer. Besides, it can also obtain the angle between the pointing direction of the device and the horizontal plane using other well-known inclining detection technology in the art.

According to embodiments of the present disclosure, wherein the obtaining data including a geographic coordinate of the device, a relative height between the device and the position point and pointing information of the device comprises: obtaining a relative height between the device and the position point through a manual input or a rangefinder. For example, when the pointed position point is located on the ground while the device is at the head height of the operating staff, the height of the operating staff can be regarded as a relative height between the device and the position point. Alternatively, the height between the device and the ground can be measured through a rangefinder (such as, ultrasonic rangefinder, laser rangefinder, infrared rangefinder and so on) connected externally to the device as the relative height between the device and the position point.

According to embodiments of the present disclosure, wherein the obtaining data including a geographic coordinate of the device, a relative height between the device and the position point and pointing information of the device comprises: obtaining a horizontal angle between the pointing direction of the device and the geographic north through an electronic compass. The electronic compass is a digital compass, which can output orientation information of the device, for example, orientation of the device is measured as 30 degrees north by east, so the horizontal angle between the pointing direction of the device and the geographic north may be determined to be 30 degrees; however, when the orientation of the device is 30 degrees north by west, the horizontal angle between the pointing direction of the device and the geographic north may be determined as −30 degrees.

According to embodiments of the present disclosure, wherein obtaining data including a geographic coordinate of the device, a relative height between the device and the position point and pointing information of the device comprises: obtaining the geographic coordinate of the device through a satellite positioning sensor or a geographic information system. For example, a current geographic coordinate of the device can be obtained in real time through the GPS positioning sensor. According to another embodiment of the present disclosure, the coordinate and direction of the device may also be acquired in the way of physical measurement.

At step 106, a geographic coordinate of the position point is generated based on the above obtained data. For example, a geographic coordinate of the intersection point between a vector of the pointing direction of the device and the horizontal plane are calculated based on vector of the pointing direction of the device, a geographic coordinate of the device and the relative height between the device and the position point, wherein the geographic coordinate of the intersection point is a geographic coordinate of the position point.

According to another embodiment of the present disclosure, wherein the generating a geographic coordinate of the position point based on the data comprises: calculating a horizontal distance between the device and the position point based on an angle between the pointing direction of the device and the horizontal plane and a relative height between the device and the position point; and calculating the geographic coordinate of the position point based on a horizontal distance between the device and the position point, a horizontal angle between the pointing direction of the device and the geographic north, and a geographic coordinate of the device. The exemplary calculating process of the geographic coordinate of the pointed position point according to the embodiments may be made a reference to the exemplary calculating method as shown in FIGS. 3A-3B.

At step 108, the method 100 for generating a geographic coordinate further includes enable an external device controlled by the device to move to the position point after generating the geographic coordinate of the position point. For example, after the device calculates the geographic coordinate of the pointed position point, such as in the example of FIG. 2, the operating staff triggers "MOVE" button; the device executes calculation and storage of geographic coordinate position of the pointed position point, and transmits the geographic coordinate of the pointed position point to the external device (such as intelligent mobile device), to control the external device to move to the pointed position point, thereby performing the "what you see is what you get" effect of pointing to a certain position and rapidly enabling the external device to move to that position.

Figure 3A:
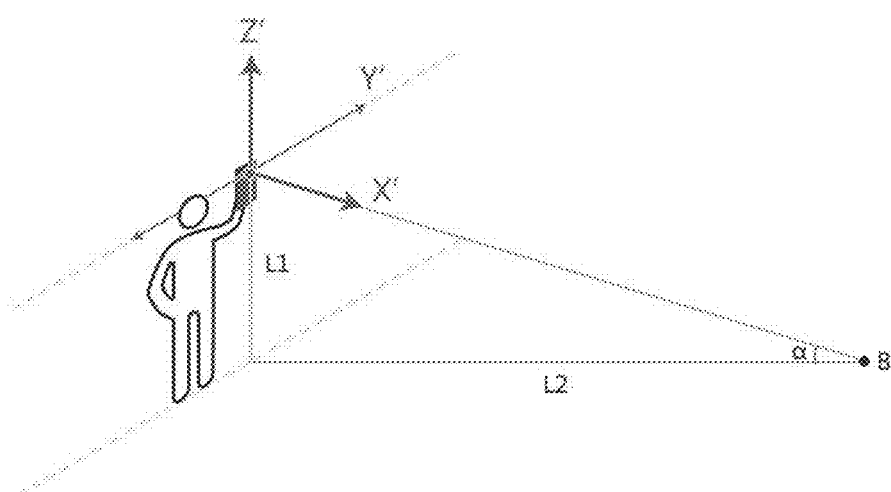
FIGS. 3A-3B illustrate coordinate graphs for calculating a geographic coordinate of a pointed position point according to one embodiment of the present disclosure.
Figure 3B:
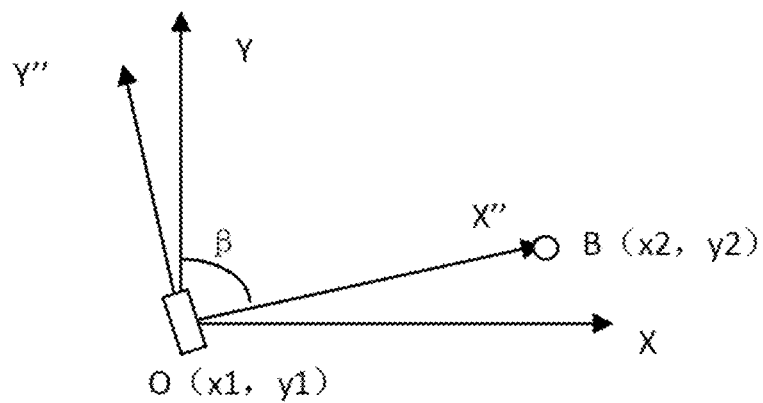
Figure 4:
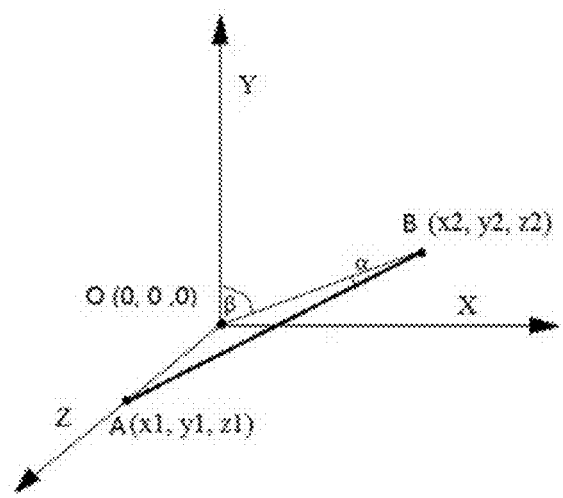
FIG. 4 illustrates a coordinate graph for calculating a geographic coordinate of a pointed position point according to another embodiment of the present disclosure.

The following FIGS. 3A-3B and FIG. 4 illustrate methods for calculating a geographic coordinate of the pointed position point according to embodiments of the present disclosure in an exemplary manner. However, the two calculating methods are only exemplary embodiments and not intended to limit contents of the present disclosure specifically to any one of the two methods below.

FIGS. 3A-3B illustrate coordinate graphs for calculating a geographic coordinate of the pointed position point according to one embodiment of the present disclosure. As shown in FIG. 3A, the operating staff lifts the device (e.g., smart phone) to his/her head position and points towards a certain position on the ground. A space rectangular coordinate system X'Y'Z' with the device as the origin is assumed, wherein X' axis is identical to the pointing direction of the camera, Y' axis points to the due left side of the device, and Z' axis points to the due upward direction of the device. As shown in FIG. 3B, the geodetic coordinate system is set as XYZ, where XY axis is on the horizontal plane. X axis points to due east, Y axis points to due north and Z axis points to due upward direction.

The intersection point B between the pointing axis X' of the device and the ground is a pointed position point. According to FIG. 3A, α represents an angle between the pointing axis X' of the device and the horizontal plane (that is angle between the pointing direction of the device and the horizontal plane). As shown in FIG. 3B, β represents an angle between projection X″ of the pointing axis X' of the device on the horizontal plane and Y axis of the geodetic coordinate system (that is, a horizontal angle between the pointing direction of the device and the geographic north). In the example of FIG. 3A, the vertical height between the device and the ground is L1 in the unit of meters, which can be input into the device in advance by the operating staff. In the example of FIG. 3B, O point is the geographic position of the device and its a geographic coordinate are measured by the GPS of the device and converted into coordinates of O point (x1, y1) in the XYZ coordinate system. The method for converting the geographic coordinate into XYZ coordinates can be implemented for example by the method in the patent application with the publication number CN1595067A as published on Mar. 16, 2005. All of its contents are incorporated into the text through reference.

In the example of FIG. 3A, α may be obtained by the data of the gravity acceleration sensor of the device, and the calculating process is: α=α sin (ax'/g), where ax' is an acceleration value in the direction of the pointing axis X' of the device and g is acceleration of gravity (approximating to 9.8 m/s^2). β can be calculated by a built-in sensor of magnetic field intensity within the device (such as electronic compass), and the existing intelligent device generally has the compass function to directly output the direction angle β of the device.

As α and L1 have been determined, a horizontal distance L2 between the device and the position point may be obtained according to the following Equation (1).

$$L2 = cot(α) \times L1 \qquad \text{Equation (1)}$$

Because β, (x1, y1) and L2 have been determined, coordinate (x2, y2) of the pointed position point B in the XYZ coordinate system may be calculated according to the following Equation (2), which coordinate may be converted to obtain the geographic coordinate of the pointed position point B.

$$x2 = x1 + L2 \times \sin(β)$$

$$y2 = y1 + L2 \times \cos(β) \qquad \text{Equation (2)}$$

FIG. 4 illustrates a coordinate graph for geographic coordinate calculation of a pointed position point according to another embodiment of the present disclosure. Similar to the embodiments of FIGS. 3A-3B, it can obtain, by use of the sensor of the device, an angle α between the pointing direction of the device and the horizontal plane, a relative height L1 between the device and the position point, a horizontal angle β between the pointing direction of the device and geographic north, and the coordinate corresponding to a geographic coordinate of the device, so as to convert into coordinates (x1, y1) in the XYZ coordinate system. The geodetic coordinate system is configured as XYZ. Point A (x1, y1, z1) represents coordinates of the device in the current XYZ coordinate system, and point B (x2, y2, z2) represents coordinate of the pointed position point in the XYZ coordinate system, wherein the relative height between the device and the position point is L1=z1−z2.

In the coordinate system XYZ, the value of (x2, y2) can be calculated according to the following Equations (3) and (4), so as to convert into a geographic coordinate of B point.

$$\cot(\alpha) = \frac{\sqrt{(x2-x1)^2 + (y2-y1)^2}}{z1-z2} \quad \text{Equation (3)}$$

$$\tan(\beta) = \frac{x2-x1}{y2-y1} \quad \text{Equation (4)}$$

In the examples of FIGS. 3A-3B and 4, when the position point is located in the first quadrant of the coordinate system XY, then x2>x1 and y2>y1; when the position point is located in the second quadrant of the coordinate system XY, then x2<x1, y2>y1; when the position point is located in the third quadrant of the coordinate system XY, then x2<x1, y2<y1; when the position point is located in the fourth quadrant of the coordinate system XY, then x2>x1, y2<y1.

Figure 5:
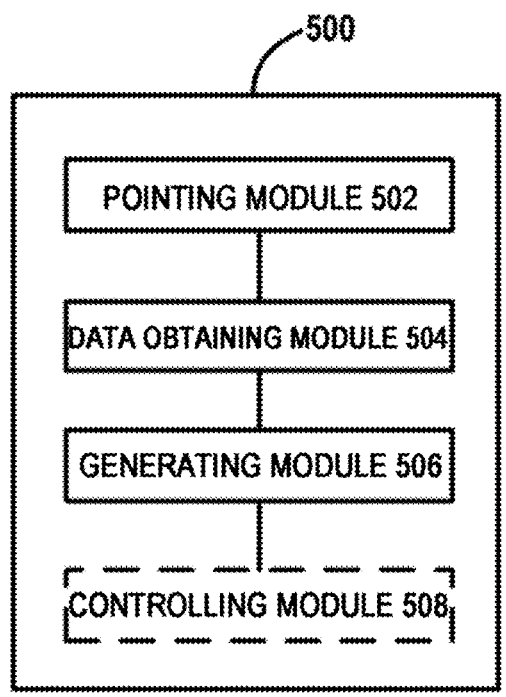
FIG. 5 illustrates a block diagram of a device 500 for generating a geographic coordinate according to embodiments of the present disclosure.

FIG. 5 graphically illustrates a block diagram of a device 500 for generating a geographic coordinate according to embodiments of the present disclosure. The device includes a pointing module 502 configured to enable the device to point to a position point; a data obtaining module 504 configured to obtain data including a geographic coordinate of the device, a relative height between the device and the position point and pointing information of the device; and a generating module 506 configured to generate a geographic coordinate of the position point based on the data.

According to one embodiment of the present disclosure, wherein the pointing information of the device comprises an angle between the pointing direction of the device and the horizontal plane, and a horizontal angle between the pointing direction of the device and the geographic north.

According to another embodiment of the present disclosure, wherein the pointing module is further configured to enable the device to point to a position point using an optical aiming device or a mechanical aiming device. According to another embodiment of the present disclosure, wherein the pointing module is further configured to enable the device to point to the position point using a camera, wherein the camera is positioned inside or outside the device.

According to one embodiment of the present disclosure, wherein the pointing module is further configured to: display an icon of a central point of the camera on the display apparatus of the device; and adjust the device such that the icon of the central point of the camera and the position point coincide with each other. According to another embodiment of the present disclosure, wherein the icon of the central point includes any of the following: an intersection point of dotted lines, an arrow, a ray and a single point.

According to one embodiment of the present disclosure, wherein the data obtaining module is further configured to: obtain an angle between the pointing direction of the device and the horizontal plane using an acceleration sensor. According to another embodiment of the present disclosure, wherein the data obtaining module is further configured to: obtain the angle between the pointing direction of the device and the horizontal plane by calculating a ratio between an acceleration value in the pointing direction of the device and a value of acceleration of gravity. According to another embodiment of the present disclosure, wherein the data obtaining module is further configured to: obtain a relative height between the device and the position point by receiving a user input or using a rangefinder. According to one embodiment of the present disclosure, wherein the data obtaining module is further configured to: obtain a horizontal angle between the pointing direction of the device and the geographic north using an electronic compass. According to another embodiment of the present disclosure, wherein the data obtaining module is further configured to: obtain a geographic coordinate of the device using a satellite positioning sensor or a geographic information system.

According to one embodiment of the present disclosure, wherein the generating module is further configured to: determine a horizontal distance between the device and the position point based on an angle between the pointing direction of the device and the horizontal plane and a relative height between the device and the position point; and determine the geographic coordinate of the position point based on a horizontal distance between the device and the position point, a horizontal angle between the pointing direction of the device and the geographic north, and the geographic coordinate of the device.

According to one embodiment of the present disclosure, the device 500 for generating a geographic coordinate further includes a controlling module 508 configured to enable an external device controlled by the device to move to the position point after generating a geographic coordinate of the position point.

It should be appreciated that the device 500 can be implemented in various manners. For example, in some embodiments, the device 500 can be implemented by hardware, software or combinations of software and hardware, wherein the hardware portion can be implemented by special logic; the software portion can be stored in the memory executed by a suitable instruction execution system, such as microprocessor or dedicated design hardware. Those skilled in the art can understand that the above method and system may be implemented by using computer executable instructions and/or including in the control codes of the processor, for example providing such codes on magnetic disk, carrier medium of CD or DVD-ROM, such as programmable memory of the read-only memory, or data carriers of optical or electronic signal carriers. Device and apparatus of the embodiments of the present disclosure may be implemented by for example super-large-scale integrated circuit or gate array, semiconductors (such as logic chip, transistors and the like), or hardware circuits of programmable hardware devices (such as field programmable gate array, programmable logic device and the like), or by software executed by various types of processors, or by the combination of the above hardware circuit and the software.

It should be understood that although the above detailed description mentions several modules or sub-modules of the device, the division is only exemplary rather than being compulsory. In fact, features and functions of the above described two or more modules can be materialized in one module according to the embodiments of the present disclosure. On the contrary, features and functions of the above described one module can be further divided and materialized by several modules.

The above description is only optional embodiments of the present disclosure, which does not limit embodiments of the present disclosure. For those skilled in the art, the present disclosure can have various modifications and alterations. Any amendments, equivalent substitutions, improvements and the like should be encompassed within the protection scope of the present disclosure as long as they are within the spirit and principle of the present disclosure.

Although embodiments of the present disclosure have been described with reference to several detailed embodiments, it should be understood that the present disclosure is not limited to the disclosed embodiments. Embodiments of the present disclosure are intended to cover various modifications and equivalent arrangements included in the spirit and scope of the appended claims. The scope of the appended claims meets the broadest explanations and covers all such modifications and equivalent structures and functions.

I claim:

1. A method for generating a geographic coordinate, comprising:
    enabling a device to point to a position point;
    obtaining a geographic coordinate of the device, a relative height between the device and the position point, and pointing information of the device, wherein the pointing information of the device comprises: an angle between a pointing direction of the device and a horizontal plane, and an angle between a projection of the pointing direction of the device on the horizontal plane and the geographic north;
    generating a geographic coordinate of the position point based on the geographic coordinate of the device, the relative height between the device and the position point, and the pointing information of the device; and
    enabling an external device controlled by the device to move to the position point, based on the generated geographic coordinate of the position point.

2. The method of claim 1, wherein the enabling a device to point to a position point comprises:
    enabling the device to point to the position point using an optical aiming device or a mechanical aiming device.

3. The method of claim 1, wherein the enabling a device to point to a position point comprises:
    enabling the device to point to the position point using a camera, the camera being located inside or outside the device.

4. The method of claim 3, wherein the enabling a device to point to a position point comprises:
    displaying, on a display apparatus of the device, an icon of a central point of the camera; and
    adjusting the device such that the icon of the central point of the camera overlaps with the position point.

5. The method of claim 4, wherein the icon of the central point comprises any of the following: an intersection point of dotted lines, an arrow, a ray and a single point.

6. The method of claim 1, wherein the obtaining a geographic coordinate of the device, a relative height between the device and the position point and pointing information of the device comprises:
    obtaining the angle between the pointing direction of the device and the horizontal plane using an acceleration sensor.

7. The method of claim 6, wherein the obtaining the angle between the pointing direction of the device and the horizontal plane using an acceleration sensor comprises:
    obtaining the angle between the pointing direction of the device and the horizontal plane by calculating a ratio between an acceleration value in the pointing direction of the device and a value of acceleration of gravity.

8. The method of claim 1, wherein the obtaining a geographic coordinate of the device, a relative height between the device and the position point and pointing information of the device comprises:
    obtaining the relative height between the device and the position point by receiving a user input or using a rangefinder.

9. The method of claim 1, wherein the obtaining a geographic coordinate of the device, a relative height between the device and the position point and pointing information of the device comprises:
    obtaining the horizontal angle between the pointing direction of the device and geographic north using an electronic compass.

10. The method of claim 1, wherein the obtaining a geographic coordinate of the device, a relative height between the device and the position point and pointing information of the device comprises:
    obtaining the geographic coordinate of the device using a satellite positioning sensor or a geographic information system.

11. The method of claim 1, wherein the generating the geographic coordinate of the position point comprises:
    calculating a horizontal distance between the device and the position point based on the angle between the pointing direction of the device and the horizontal plane, and the relative height between the device and the position point; and
    calculating the geographic coordinate of the position point based on the horizontal distance between the device and the position point, the horizontal angle between the pointing direction of the device and geographic north, and the geographic coordinate of the device.

12. A device for generating a geographic coordinate, comprising:
    a pointing module configured to enable the device to point to a position point;
    a data obtaining module configured to obtain a geographic coordinate of the device, a relative height between the device and the position point and pointing information of the device, wherein the pointing information of the device comprises: an angle between a pointing direction of the device and a horizontal plane, and an angle between a projection of the pointing direction of the device on the horizontal plane and the geographic north;
    a generating module configured to generate a geographic coordinate of the position point based on the geographic coordinate of the device, the relative height between the device and the position point, and the pointing information of the device; and
    a controlling module configured to enable an external device controlled by the device to move to the position point based on the generated geographic coordinate of the position point.

13. The device of claim 12, wherein the pointing module is further configured to:
    enable the device to point to the position point using an optical aiming device or a mechanical aiming device.

14. The device of claim 12, wherein the pointing module is further configured to:
    enable the device to point to the position point using a camera, the camera being located inside or outside the device.

15. The device of claim 14, wherein the pointing module is further configured to:

display, on a display apparatus of the device, an icon of a central point of the camera; and adjust the device such that the icon of the central point of the camera overlaps with the position point.

16. The device of claim 15, wherein the icon of the central point comprises any of the following: an intersection point of dotted lines, an arrow, a ray and a single point.

17. The device of claim 12, wherein the data obtaining module is further configured to:

obtain the angle between the pointing direction of the device and the horizontal plane using an acceleration sensor.

* * * * *